(12) United States Patent
Taya (10) Patent No.: US 12,536,883 B2
(45) Date of Patent: Jan. 27, 2026

(54) POINT-OF-SALE TERMINAL, METHOD, AND MEDIUM

(71) Applicant: Toshiba Tec Kabushiki Kaisha, Tokyo (JP)

(72) Inventor: Yusuke Taya, Izunokuni Shizuoka (JP)

(73) Assignee: Toshiba Tec Kabushiki Kaisha, Tokyo (JP)

(\*) Notice: Subject to any disclaimer, the term of this patent is extended or adjusted under 35 U.S.C. 154(b) by 0 days.

(21) Appl. No.: 18/752,760

(22) Filed: Jun. 24, 2024

(65) Prior Publication Data
US 2025/0124770 A1  Apr. 17, 2025

(30) Foreign Application Priority Data
Oct. 13, 2023  (JP) .................. 2023-177401

(51) Int. Cl.
*G06Q 20/20* (2012.01)
*G06V 20/64* (2022.01)
(Continued)

(52) U.S. Cl.
CPC .......... *G07G 1/0081* (2013.01); *G06V 20/64* (2022.01); *G06V 40/10* (2022.01); *G06V 40/28* (2022.01); *G07G 1/01* (2013.01)

(58) Field of Classification Search
CPC ........ G07G 1/0081; G07G 1/01; G06V 20/64; G06V 40/10; G06V 40/28
See application file for complete search history.

(56) References Cited

U.S. PATENT DOCUMENTS 5,729,697 A  *  3/1998  Schkolnick .......... G06Q 20/208
                                                    235/383
11,875,654 B2     1/2024  Murakami et al.
(Continued)

FOREIGN PATENT DOCUMENTS

CN        106570745 A  *  4/2017
CN        108197931 A  *  6/2018
(Continued)

OTHER PUBLICATIONS

JP2024083786A Information Processing System, Information Processing Method and Program, 11 pages. (Year: 2025).*
(Continued)

*Primary Examiner* — Tuyen K Vo
(74) *Attorney, Agent, or Firm* — Kim & Stewart LLP (57) ABSTRACT

A point-of-sale terminal attachable to a shopping cart, includes an interface connected to an imaging device, an input device, and a processor configured to: control the imaging device to capture an image and generate image data based on the captured image, perform object recognition on the image data, and perform an automatic registration process for automatically registering an item when the item is identified by the recognition. The processor is configured to: determine whether a predetermined motion of a body part is detected based on a result of recognition or whether a predetermined operation is input via the input device, upon determining that the predetermined motion is detected or the predetermined operation is input, temporarily disable the registration process such that an item is not automatically registered for purchase or automatically removed from a list of registered items even when the item is identified by the recognition.

20 Claims, 5 Drawing Sheets

(51) Int. Cl.
  *G06V 40/10*    (2022.01)
  *G06V 40/20*    (2022.01)
  *G07G 1/00*     (2006.01)
  *G07G 1/01*     (2006.01)

(56) References Cited

U.S. PATENT DOCUMENTS

2012/0284132 A1* 11/2012 Kim .................. G06Q 20/18
                                                    235/375
2017/0186072 A1*  6/2017 Clark ................ G06Q 30/0633
2019/0279281 A1*  9/2019 Kumar ............... G06Q 30/0631
2022/0198550 A1*  6/2022 Meidar ................ G06Q 20/20
2023/0368216 A1* 11/2023 Hagen ............... G06Q 30/0185

FOREIGN PATENT DOCUMENTS

CN       114426057 A  *  5/2022    ........... B62B 3/1428
EP         3496059 A1  *  6/2019    ............ B62B 3/142
JP       2024083786 A  *  6/2024

OTHER PUBLICATIONS

CN106570745A A supermarket intelligent self-help shopping system and method, 6 pages. (Year: 2025).*
CN108197931A A market artificial intelligence NFC cash automatic payment system and method of use, 8 pages. (Year: 2025).*
CN114426057A Supermarket intelligent shopping trolley and its recognition, 9 pages. (Year: 2025).*

* cited by examiner

POINT-OF-SALE TERMINAL, METHOD, AND MEDIUM

CROSS-REFERENCE TO RELATED APPLICATION(S)

This application is based upon and claims the benefit of priority from Japanese Patent Application No. 2023-177401, filed Oct. 13, 2023, the entire contents of which are incorporated herein by reference.

FIELD

Embodiments described herein relate generally to a point-of-sale (POS) terminal, a method, and a medium.

BACKGROUND

Along with the decline in the working population, in stores such as supermarkets, as a part of measures to save labor, a checkout system using a self-service POS terminal or a semi-self-service POS terminal has been introduced, in which a customer himself/herself registers an item to be purchased and pays for the item.

In addition, as a new form, a check-out system of a moving type in which a customer himself/herself performs item registration while moving inside a store has been introduced. For example, the customer can register an item by operating a terminal device attached to a shopping cart to read a code symbol such as a bar code attached to an item. Further, in recent years, there has been proposed a technique of automatically registering an item or canceling its registration by recognizing the item stored in a cart or taken out from the cart based on an image captured by a camera attached to the cart.

Incidentally, a customer may perform an operation of sorting the items stored in the basket (hereinafter, also referred to as "in-basket sorting") such as moving the items stored in the basket during shopping. For example, a customer may place a heavy item at the bottom of the basket or place a fragile item such as eggs or bread on the top of the stored items.

However, in the conventional system described above, if an item is moved for in-basket sorting and its image is captured by the camera, item registration or registration cancellation can be performed incorrectly.

SUMMARY OF THE INVENTION

Embodiments of the present disclosure provide a POS terminal, a method, and a medium for storing a program capable of suitably performing in-basket sorting.

A POS terminal attachable to a shopping cart, comprises: an interface circuit connected to an imaging device; an input device; and a processor configured to: control the imaging device to capture an image and generate image data based on the captured image, perform object recognition on the image data, and perform an automatic registration process for automatically registering an item for purchase when the item is identified by the object recognition. The processor is further configured to: determine whether a first predetermined motion of a body part is detected based on a result of object recognition or whether a predetermined operation is input via the input device, and upon determining that the first predetermined motion is detected or the predetermined operation is input, temporarily disable the automatic registration process such that an item is not automatically registered for purchase or automatically removed from a list of registered items even when the item is identified by the object recognition.

DETAILED DESCRIPTION

Hereinafter, embodiments will be described in detail with reference to the drawings. The present disclosure is not limited to the embodiments described below.

In the following embodiments, a terminal device attached to a shopping cart used for carrying items in a store (hereinafter, also referred to as a cart) will be described as an example of a POS terminal. Note that the embodiments of the present disclosure are not limited by this application example.

Figure 1:
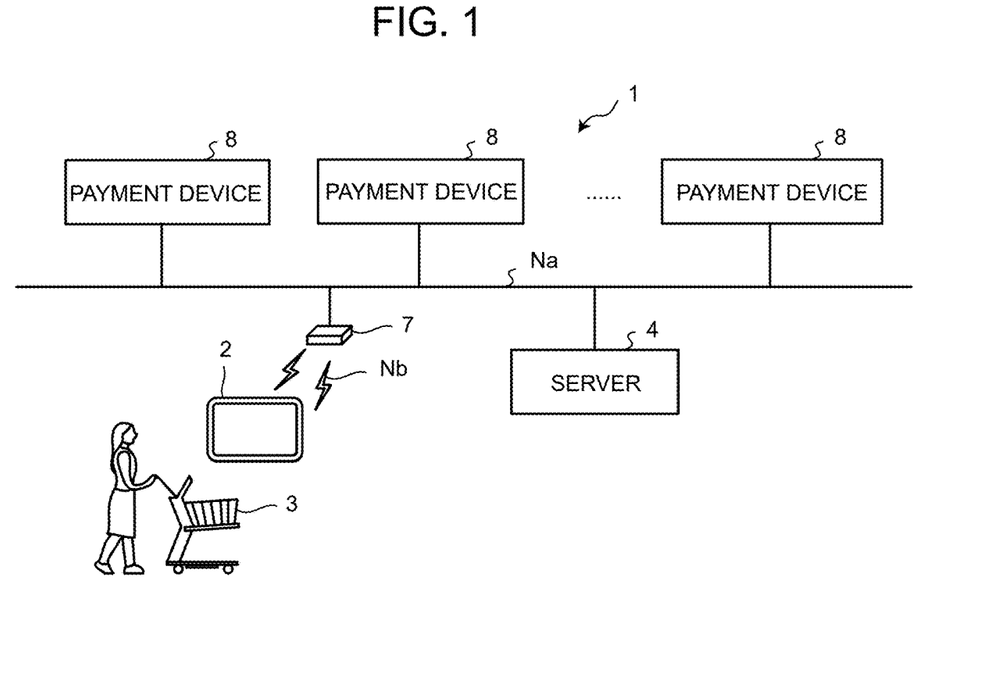
FIG. 1 is a diagram of a checkout system according to an embodiment.

FIG. 1 is a diagram illustrating a checkout system 1 according to an embodiment. As illustrated in FIG. 1, the checkout system 1 includes a terminal device 2, a server 4, and one or more payment devices 8. The server 4 and each of the payment devices 8 are communicably connected via a network Na.

As the network Na, the Internet, a virtual private network (VPN), a local area network (LAN), a public communication network, a mobile communication network, or the like can be used singly or in combination as appropriate. As the network Na, the Internet and a mobile communication network are used in combination.

A wireless access point 7 is also connected to the network Na. The wireless access point 7 is connected to the terminal device 2 via a network Nb such as a wireless LAN. Therefore, the terminal device 2 can communicate with the server 4 and the payment device 8.

The cart 3 includes a basket 31 (see FIG. 2) that stores items displayed and sold in a store. An upper portion of the basket 31 is opened so that an item can be placed in the basket 31 from above. A customer moves inside the store with the shopping cart 3, takes an item displayed in the store, and stores the item in the basket 31 of the shopping cart 3.

Figure 2:
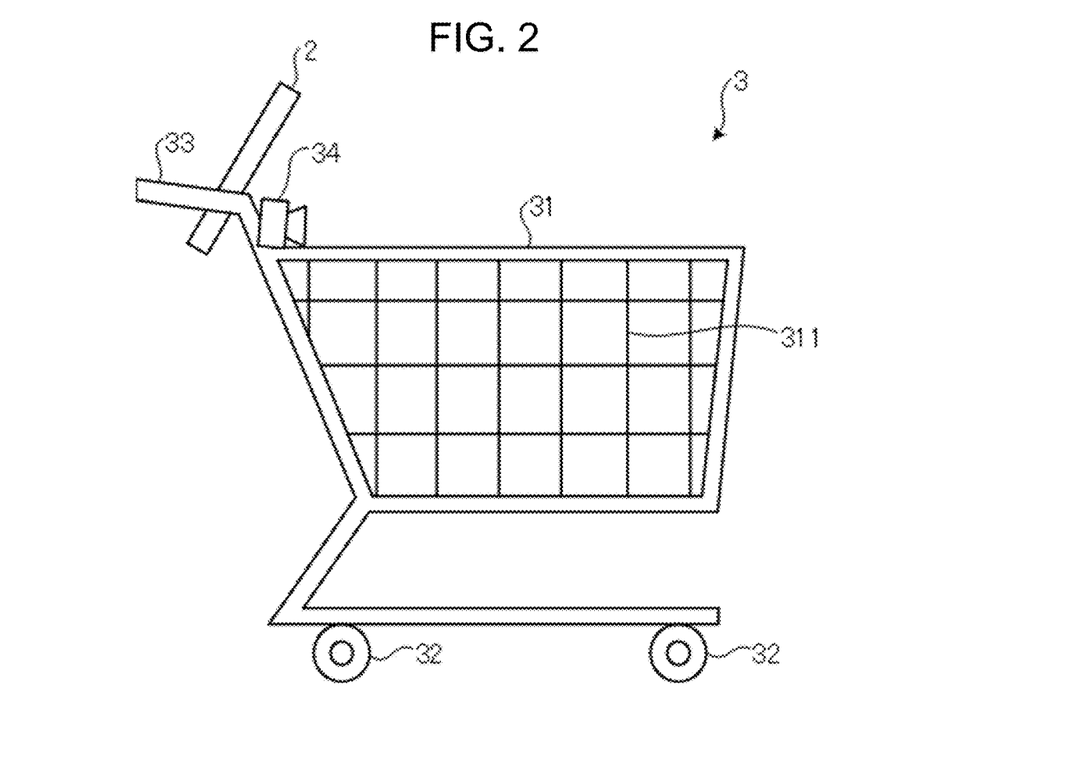
FIG. 2 is a side view of a shopping cart according to an embodiment.

The terminal device 2 is a mobile terminal device such as a tablet terminal operated by a customer. In an embodiment, the terminal device 2 is attached to the cart 3 and operated by the customer who is using the cart 3.

The terminal device 2 recognizes the item inserted into the basket 31 from an image captured by an imaging unit 34, which will be described later, and executes a sales registration process related to the item. Here, the sales registration process is also referred to as item registration, sales registration, or the like, and means a process of making the item recognized by the terminal device 2 a purchase target. Specifically, the sales registration process refers to a process of registering information on the recognized item in the sales registration table 243 described later. Hereinafter, the information on the item registered in the sales registration table 243 is also referred to as "sales registration data".

In addition, when receiving an operation for performing a checkout of an item (hereinafter, also referred to as payment), the terminal device 2 executes a process for transmitting the sales registration data for one transaction registered in the sales registration process to the payment device 8. For example, the terminal device 2 encodes the sales registration data into a code symbol such as a two-dimensional code and displays the code symbol. In this case, the payment device 8 reads the code symbol displayed on the terminal device 2 to acquire the sales registration data, and executes a payment process based on the acquired sales registration data.

The server 4 is an example of a server device. The server 4 manages information or data related to a transaction of an item at a store in which the terminal device 2 is used. For example, the server 4 provides a copy of the item master database to be described later to the terminal device 2. Note that the server 4 may be a store server provided in a store or a server device provided outside the store. Further, in an embodiment, the server 4 is a single device. However, the server 4 may be a cloud server (or a cloud system) including a plurality of devices connected to a network.

The payment device 8 is a payment device provided in a store. The payment device 8 executes a payment process of purchased items based on sales registration data. The payment process refers to the display of the total amount of money or tax of items related to one transaction, processing for calculating and displaying the change based on the cash paid by the customer, processing for issuing a receipt printed with item information and payment information (e.g., total amount, deposit amount, change amount, etc.). In an embodiment, the payment device 8 is a self-service-type payment device in which a customer who has performed sales registration using the terminal device 2 can perform payment processing by his/her own operation. However, the payment device 8 is not limited to this, and may be operated by an employee such as a store clerk.

Next, the cart 3 will be described. FIG. 2 is a side view of the cart 3. The cart 3 includes a basket 31, casters 32 disposed below the basket 31, a handle 33 connected to the basket 31 and the casters 32 and gripped by a customer when the cart 3 is moved, and the like.

The basket 31 has side surfaces and a bottom surface each having a substantially square shape with a mesh-like grid 311 so that the item stored in the basket 31 can be visually viewed from the outside. Note that each of the side surfaces and the bottom surface may be formed by a continuous wall surface instead of the mesh-like grid 311.

The cart 3 includes a terminal device 2 in the vicinity of the handle 33. Further, the cart 3 includes an imaging unit 34 near the edge of the opening of the basket 31. The imaging unit 34 is an imaging device such as a digital camera. The imaging unit 34 is installed such that the imaging direction faces the opening of the basket 31. That is, the imaging direction and the imaging range are set so that the imaging unit 34 can capture an image of the item placed in and taken out of the basket 31. Note that the imaging unit 34 may be included in the terminal device 2.

The imaging unit 34 captures an image of an item stored in the basket 31 or an item taken out from the basket 31, and outputs the captured image to the terminal device 2. Here, the image means a still image or a video including multiple frames.

Note that the configuration of the cart 3 is not limited to the illustrated example of FIG. 2. For example, the number of imaging units 34 is not limited to one, and a plurality of imaging units may be provided. In addition, the terminal device 2 may be configured to be detachably attached to the cart 3. In this case, a portable terminal such as a smartphone, a tablet terminal, or the like owned by a customer or loaned by a store may be attached to the cart 3.

Figure 3:
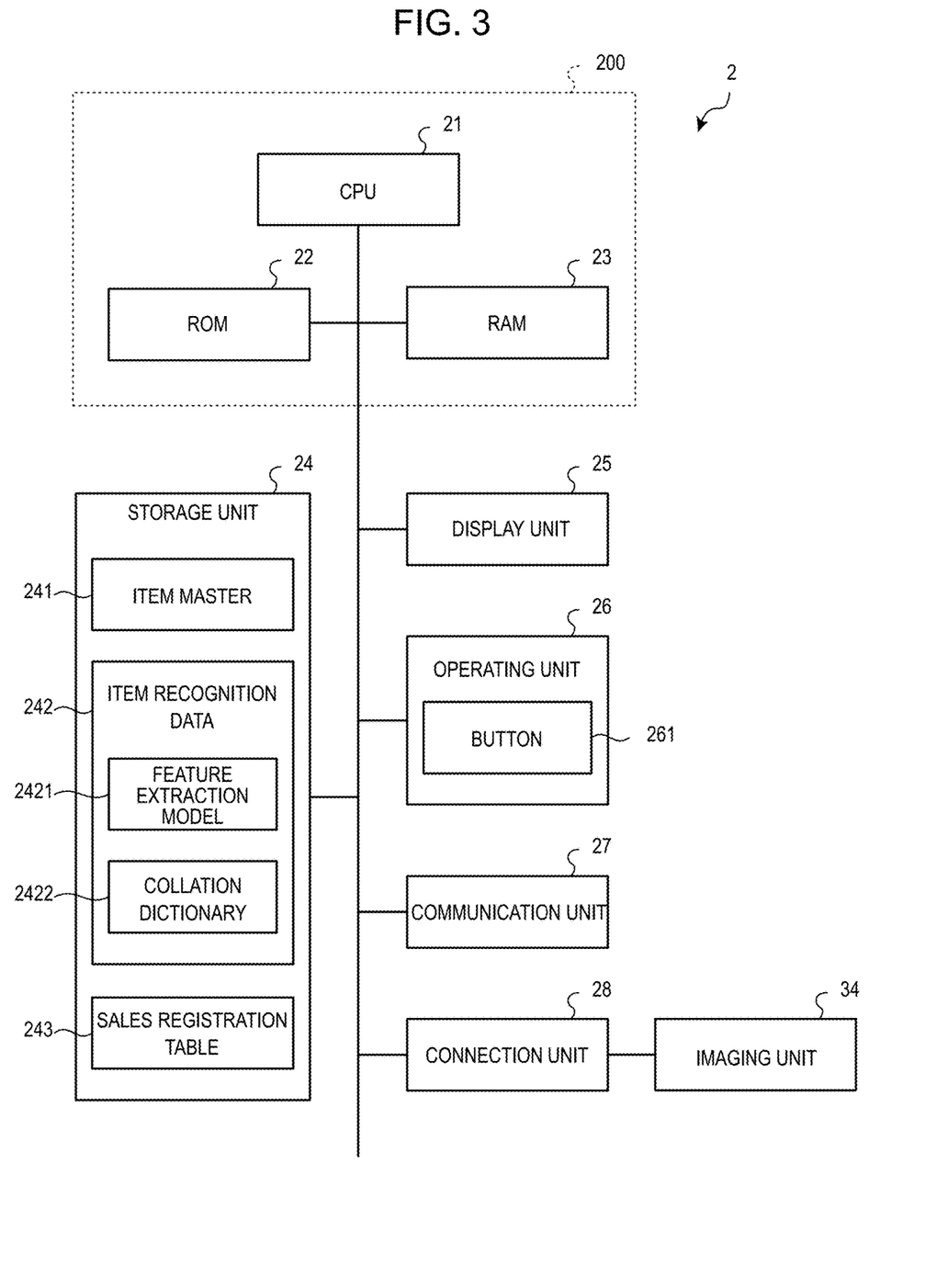
FIG. 3 is a diagram of a hardware configuration of a terminal device according to an embodiment.

Hereinafter, a configuration example of the terminal device 2 will be described. FIG. 3 is a diagram illustrating an example of a hardware configuration of the terminal device 2.

As illustrated in FIG. 3, the terminal device 2 includes a central processing unit (CPU) 21, a read only memory (ROM) 22, a random access memory (RAM) 23, a storage unit 24, a display unit 25, an operating unit 26, a communication unit 27, a connection unit 28, and the like.

The CPU 21 is a processor and comprehensively controls the operation of the terminal device 2. The ROM 22 stores various programs. The RAM 23 is a workspace for loading programs and various types of data.

The CPU 21, the ROM 22 and the RAM 23 are connected to each other via a bus or the like, and constitute a controller 200. The controller 200 executes various processes in accordance with a program(s) stored in the ROM 22 or the storage unit 24 and loaded onto the RAM 23.

The storage unit 24 includes a storage medium such as a hard disk drive (HDD) or a flash memory, and maintains data even if the power supply is cut off. The storage unit 24 stores programs that can be executed by CPU 21 and various types of setting data. For example, an application program for cooperating with the checkout system 1 is stored in the storage unit 24 in advance.

Figure 4:
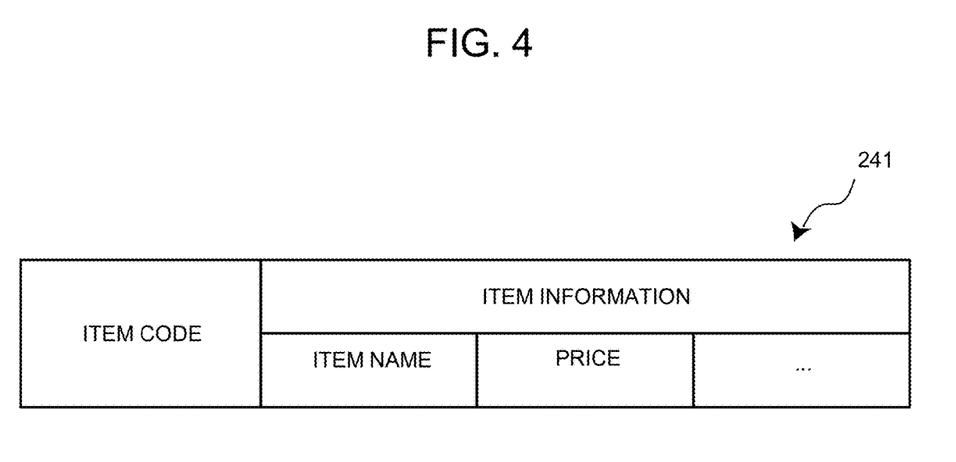
FIG. 4 is a diagram of a data configuration of an item master according to an embodiment.

Further, the storage unit 24 stores the item master database 241 (hereinafter simply referred to as the item master), the item recognition data 242, and the like. The item master 241 is a data table for storing and managing item information of the items sold at a store. FIG. 4 is a diagram illustrating an example of a data configuration of the item master 241. As illustrated in FIG. 4, the item master 241 stores an item code and item information in association with each other.

The item code is identification information for identifying an item sold at a store. The item information is information on the item corresponding to the item code. The item information includes, for example, an item name, a price, and the like.

The item recognition data 242 is a data set for recognizing and identifying an item from its appearance feature. Here, the appearance feature of an item includes, for example, a design, a pattern, a color tone, a texture, a shape, and the like of the item or its package. Hereinafter, a process of identifying an item code from the appearance feature of the item is also referred to as a "package recognition process".

The item recognition data 242 includes, for example, a feature extraction model 2421 and a collation dictionary 2422.

The feature extraction model 2421 is a learned model trained for extracting a feature amount (for example, a feature vector) representing an appearance feature of an item. When an image is input, the feature extraction model 2421 extracts and outputs a feature indicating an appearance feature of an item represented in the image. For example, a known technique such as Convolutional Neural Network (CNN) can be used to extract such a feature.

The collation dictionary 2422 is dictionary data for specifying the item corresponding to the feature extracted from the image. For example, the collation dictionary 2422 stores, for a plurality of items sold at a store, an item code corresponding to each item and a feature (hereinafter, also referred to as a collation feature) representing an appearance feature of the item in association with each other.

In the package recognition process, the feature of the item extracted from the image using the feature extraction model 2421 is compared with the feature of each item registered in the collation dictionary 2422 to calculate the degree of similarity (also referred to as distance or likelihood) between the features. Then, in the package recognition process, an item code in which the degree of similarity of the feature exceeds a threshold value (for example, 90%) among the items registered in the collation dictionary 2422 is specified.

Figure 5:
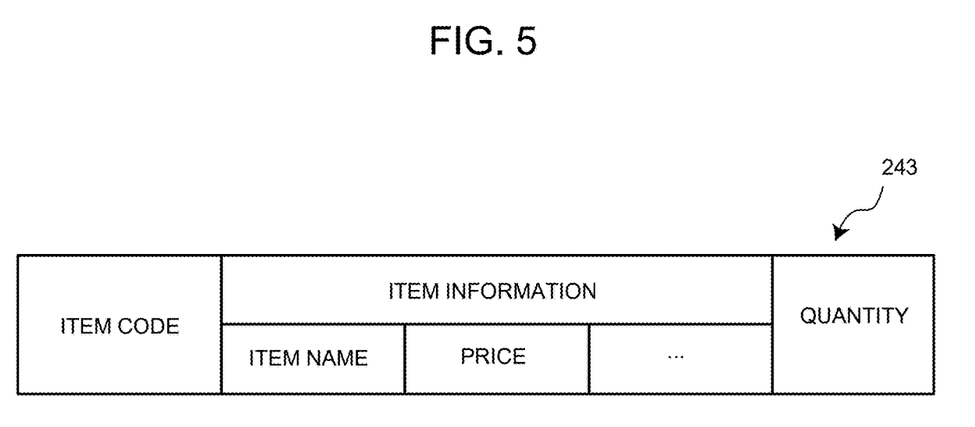
FIG. 5 is a diagram of a data configuration of a sales registration table according to an embodiment.

The storage unit 24 stores a sales registration table 243. The sales registration table 243 is a data table for storing and managing items registered for sales in the terminal device 2. FIG. 5 is a diagram illustrating an example of a data configuration of the sales registration table 243.

As illustrated in FIG. 5, the sales registration table 243 stores an item code, item information, a quantity, and the like in association with each other. Here, in the data configuration of the sales registration table 243, for example, a set of an item code, item information including an item name, and a quantity corresponds to sales registration data.

The item code is a code for identifying the item registered for sales, and corresponds to the item code registered in the item master 241. The item information is a copy of the item information (e.g., an item name, a price, and the like) stored in the item master 241 corresponding to the item code of the item registered for sales. The quantity means the quantity of the item registered in the sales.

Note that the data configuration of the sales registration table 243 is not limited to FIG. 5. For example, the sales registration table 243 may have a data configuration that does not include any item information.

Referring back to FIG. 3, the display unit 25 is a display device such as a liquid crystal display (LCD). The display unit 25 displays various types of data under the control of the CPU 21. The operating unit 26 is an input device such as a keyboard or a pointing device.

The operating unit 26 outputs a signal corresponding to an operation that is input via the input device. For example, the operating unit 26 includes a button 261 capable of disabling a function related to the above-described package recognition process. The operating unit 26 may be a touch panel provided on the display unit 25. When the operating unit 26 is configured as a touch panel, for example, the button 261 may be a user interface component displayed on a screen.

The communication unit 27 is a wired or wireless communication interface circuit connectable to the network Nb. The communication unit 27 is communicably connected to the wireless access point 7 via the network Nb. The controller 200 communicates with an external device such as the server 4 and the payment device 8 via the communication unit 27.

The connection unit 28 is an interface circuit connectable to various peripheral devices. The connection unit 28 is a wired or wireless interface conforming to a standard of short-range wireless communication such as Universal Serial Bus (USB) or Bluetooth (registered trademark). In one embodiment, the connection unit 28 is connectable to the imaging unit 34.

Figure 6:
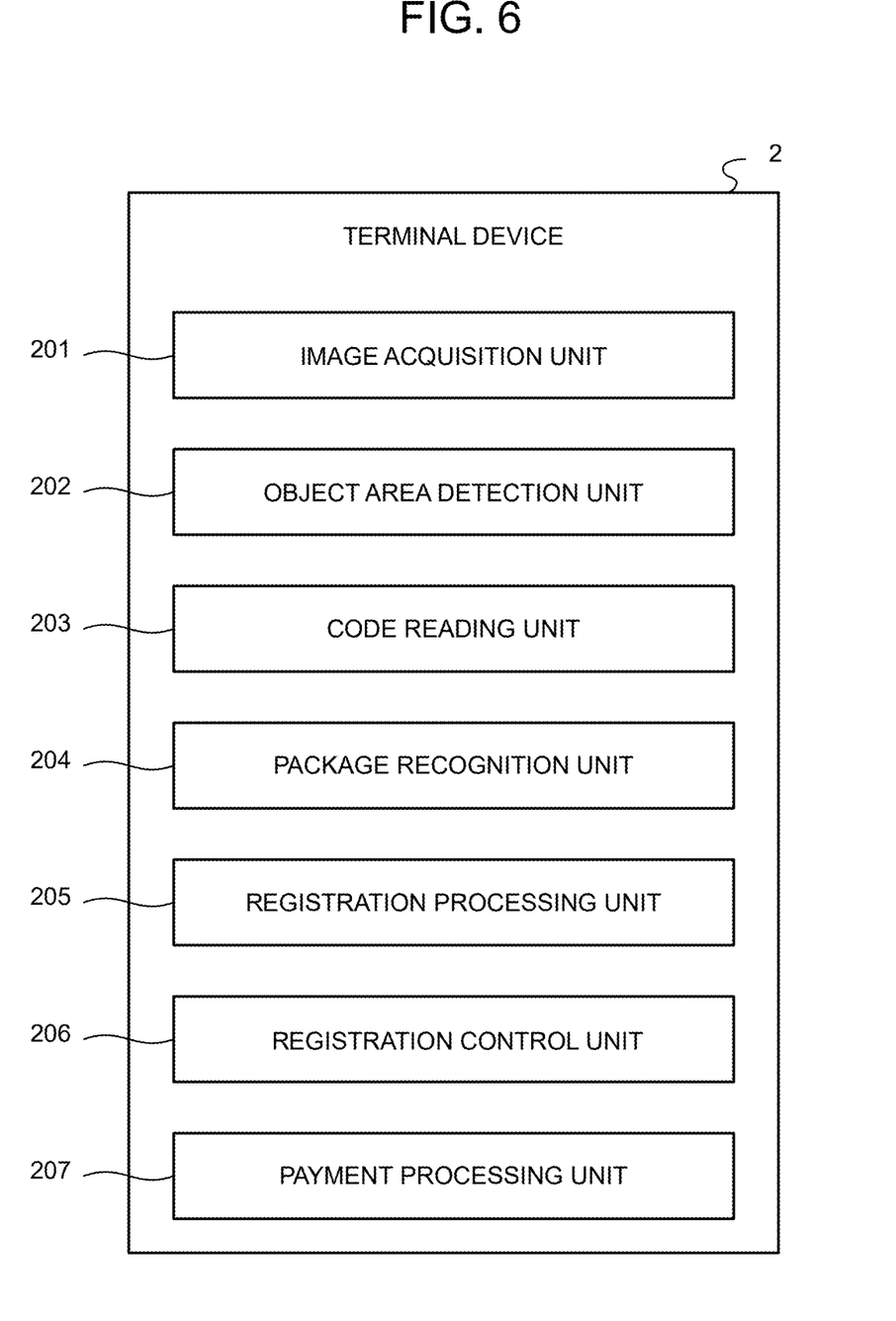
FIG. 6 is a diagram of a functional configuration of the terminal device.

Next, a functional configuration of the terminal device 2 will be described. FIG. 6 is a diagram illustrating an example of a functional configuration of the terminal device 2.

As illustrated in FIG. 6, the terminal device 2 performs the functions of an image acquisition unit 201, an object area detection unit 202, a code reading unit 203, a package recognition unit 204, a registration processing unit 205, a registration control unit 206, and a payment processing unit 207.

Those functions of the terminal device 2 are performed by the CPU 21 or the controller 200 of the terminal device 2 in accordance with a program stored in the ROM 22 or the storage unit 24, but the present invention is not limited thereto, and for example, some or all of the functions may be performed by hardware such as dedicated circuitry.

The image acquisition unit 201 controls the imaging unit 34 to capture and acquire an image (hereinafter, also referred to as a captured image) via the connection unit 28. The captured image acquired by the image acquisition unit 201 is temporarily stored in the RAM 23 for processing in the code reading unit 203 and the registration processing unit 205.

The object area detection unit 202 detects an area in which an object is shown from the captured image. Specifically, the object area detection unit 202 detects an area in which an item is shown (hereinafter, also referred to as an item area) from the image acquired by the image acquisition unit 201, and outputs information representing the item area. It should be noted that a known object detection technique such as Single Shot multibox Detector (SSD) can be used as the method for detecting the item area.

Further, the object area detection unit 202 detects the moving direction of the item by detecting the position and motion (for example, motion vector) of the item area from each of the images continuously acquired in time series by the image acquisition unit 201.

For example, when an item is placed into the basket 31, the object area detection unit 202 detects that the item has moved downward (hereinafter, also referred to as a placing direction). When an item is taken out from the basket 31, the object area detection unit 202 detects that the item has moved upward (hereinafter, also referred to as a take-out direction).

Further, the object area detection unit 202 detects an area in which a hand is shown (hereinafter, also referred to as a hand area) from the image acquired by the image acquisition unit 201 by using a known object detection technique, and outputs information representing the hand area. Further, the object area detection unit 202 determines the moving direction of the hand by detecting the position and movement of the hand area from the images acquired by the image acquisition unit 201 continuously in time series.

The code reading unit 203 reads information from a code symbol such as a bar code and a two-dimensional code included in a captured image. Specifically, the code reading unit 203 executes a code reading process for reading a code symbol on the item area detected by the object area detection unit 202.

In the code reading process, the code reading unit 203 extracts an image representing a code symbol from the item area, and decodes the extracted code symbol to obtain information represented by the code symbol. For example, the code reading unit 203 acquires an item code of an item by reading a code symbol attached to the item.

The package recognition unit 204 recognizes the item shown in the captured image by executing the package recognition process on the captured image using the item recognition data 242.

Specifically, the package recognition unit 204 extracts the feature of the item in the item area detected by the object area detection unit 202 by executing the package recognition process on the item area. Next, the package recognition unit 204 collates the extracted feature with the collation feature of each item registered in the collation dictionary 2422, thereby acquiring, from the collation dictionary 2422, an item code of an item whose degree of similarity exceeds a threshold value and is the greatest, and outputs the item code as a recognition result.

The registration processing unit 205 executes a sales registration process or a registration cancellation process of an item based on the moving direction of the item determined by the object area detection unit 202, the item code read by the code reading unit 203, or the item code recognized by the package recognition unit 204.

When an item code is acquired by the code reading unit 203 or the package recognition unit 204 and the movement in the placing direction is detected by the object area detection unit 202, the registration processing unit 205 executes a sales registration process of registering the item corresponding to the item code in the sales registration table 243. Specifically, the registration processing unit 205 reads the item information corresponding to the item code acquired by the code reading unit 203 or the package recognition unit 204 from the item master 241, associates the item code with the quantity (initial value is 1), and registers it in the sales registration table 243. In addition, when the item code registered in the sales registration table 243 is acquired by the code reading unit 203 or the package recognition unit 204 and the movement in the placing direction is detected by the object area detection unit 202, the registration processing unit 205 adds 1 to the quantity of the corresponding sales registration data.

In addition, when an item code is acquired by the code reading unit 203 or the package recognition unit 204 and the movement in the take-out direction is detected by the object area detection unit 202, the registration processing unit 205 executes processing for canceling the sales registration of the item corresponding to the item code. Specifically, the registration processing unit 205 searches the sales registration table 243 for sales registration data corresponding to the acquired item code, and subtracts the quantity of the retrieved sales registration data by one. In addition, when the result quantity of the subtraction becomes 0, the registration processing unit 205 deletes the sales registration data from the sales registration table 243.

Further, each time the sales registration table 243 is updated, the registration processing unit 205 causes the display unit 25 to display a screen based on the sales registration data registered in the sales registration table 243. For example, the registration processing unit 205 causes the display unit 25 to display a screen on which the sales registration item is displayed in a list.

As described above, in the checkout system 1, when a customer places an item into the basket 31 of the cart 3, the sales registration of the item is automatically performed. Further, in the checkout system 1, the registration cancellation of an item is automatically performed by the customer taking out the item from the basket 31 of the cart 3. In other words, the checkout system 1 is a sales floor movement type checkout system in which a customer can register an item by himself/herself while moving inside a store.

Incidentally, a customer may perform an operation of sorting items in the basket 31 (hereinafter, also referred to as "in-basket sorting") such as moving the items stored in the basket 31 during shopping. For example, a customer may perform in-basket sorting such as placing a heavy item at the bottom of the basket 31 or placing a fragile item such as eggs, bread, or the like on the top of the items stored in the basket 31.

However, in the configuration in which item registration or registration cancellation is performed by a conventional package recognition, there is a possibility that an item moved by in-basket sorting is erroneously recognized for registration or cancellation. For example, when an item is taken in and out from the basket 31 by in-basket sorting, there is a possibility that an item registration and a registration cancellation which are not intended by the customer may be performed on the item.

Therefore, in the terminal device 2 of an embodiment, by providing the registration control unit 206, when a customer performs in-basket sorting, the sales registration and the registration cancellation of the item are controlled so as not to be performed inadvertently.

The registration control unit 206 performs control for disabling a sales registration/registration cancellation function (hereinafter, also referred to as an automatic registration function) by the registration processing unit 205 on condition that a customer who is an operator of the terminal device 2 performs a predetermined operation. Specifically, the registration control unit 206 performs control for disabling the automatic registration function when an operation (or operation) for instructing the start of the in-basket sorting is detected.

For example, upon detecting an operation of the button 261, the registration control unit 206 performs control for disabling the automatic registration function. Here, the control for disabling the automatic registration function may stop or disable the function of the code reading unit 203 and the package recognition unit 204, or may stop or disable the function of the registration processing unit 205.

When the customer operating the terminal device 2 sorts the items stored in the basket 31, the customer can sort the items in the basket 31 in a state in which the automatic registration function is disabled by operating the button 261. As a result, the terminal device 2 can prevent a situation in which the item registration and the registration cancellation which are not intended by the customer are performed even when the in-basket sorting is performed.

Here, it is preferable that, when the automatic registration function is disabled, the registration control unit 206 causes the display unit 25 to display a message or the like for notifying that the automatic registration function is in a disabled state. Thus, the customer can easily confirm whether the operation of the button 261 has been reflected by looking at the screen of the display unit 25. In addition, the customer can easily confirm whether the automatic registration function is disabled. Therefore, the terminal device 2 can improve the convenience of the customer related to the in-basket sorting.

Further, when the registration control unit 206 detects the operation of the button 261 again in a state in which the automatic registration function is disabled, it determines that the end of the in-basket sorting is detected, and by enabling the automatic registration function, it is set to a state in which the sales registration or the registration cancellation of the item can be performed. In other words, the button 261 functions as a user interface component capable of alternately switching between enabling and disabling the automatic registration function. The operator instructing the end of the in-basket sorting is not limited to the button 261, and a user interface component for enabling the automatic registration function may be separately provided.

Note that the registration control unit 206 may disable the automatic registration function in a case where an operation for instructing the start of in-basket sorting is detected from the captured image, in addition to the explicit instruction operation via the button 261. Specifically, the registration control unit 206 cooperates with the object area detection unit 202 to perform control for disabling the automatic registration function when an operation for instructing the start of in-basket sorting is detected from the captured image.

For example, the registration control unit 206 determines that the start operation of the in-basket sorting has been detected on the condition that two hand areas are detected in a state in which the item area is not detected by the object area detection unit 202, that is, both hands have entered the basket 31. Since the in-basket sorting is generally performed with both hands, it is possible to detect that the in-basket sorting has started by detecting that both hands have entered the basket 31.

Further, as another example, the registration control unit 206 determines that the start operation of the in-basket sorting has been detected when the moving direction of the item area detected by the object area detection unit 202 has a vector component in the horizontal direction and the movement amount in the horizontal direction exceeds a threshold value. In general, in the in-basket sorting, the item stored in the basket 31 is moved to another position in the basket 31, and therefore, by detecting the movement of the item in the horizontal direction, it is possible to detect that the in-basket sorting has started. It should be noted that the threshold value of the movement amount is preferably determined based on the movement amount of the item which is generally performed in the actual in-basket sorting.

Further, as another example, the registration control unit 206 determines that the start operation of the in-basket sorting has been detected when the movement amount of the item area detected by the object area detection unit 202 in any direction is less than the threshold value for a predetermined period of time continuously, that is, when the item is in a substantially stationary state in the vicinity of the opening of the basket 31. In the in-basket sorting, when an item is moved to another position, the item may be held in a state in which the item is gripped, and therefore, by detecting that the item is in a substantially stationary state, it is possible to detect that the in-basket sorting is started. Note that it is preferable that the threshold values of the movement amount and the duration time are determined based on the movement amount and the duration time when the item is held in the actual in-basket sorting.

As a result, the terminal device 2 can prevent a situation in which item registration and registration cancellation that are not intended by a customer are performed even when in-basket sorting is performed without explicit instruction by the button 261.

When the end of in-basket sorting is detected from the captured image, the registration control unit 206 enables the automatic registration function so that the sales registration or the registration cancellation can be performed on another item. Here, the end detection of the in-basket sorting may be performed, for example, on the condition that both hands of the customer are pull back from the basket 31. Further, for example, the condition may be that any item area is no longer detected from the captured image.

The payment processing unit 207 executes processing for settling the sales-registered item in accordance with the operation of the customer. Specifically, the payment processing unit 207 performs processing for transmitting the sales registration data of the sales-registered item to the payment device 8, thereby realizing a state in which settlement can be performed by the payment device 8.

For example, when receiving an operation for instructing the end of the sales registration via the operating unit 26 and an operation for instructing the start of the settlement (hereinafter, also collectively referred to as a closing operation), the payment processing unit 207 controls the communication unit 27 to transmit the sales registration data registered in the sales registration table 243 to the payment device 8 by short-range wireless communication such as Bluetooth (registered trademark).

Further, for example, the payment processing unit 207 may control the communication unit 27 to transmit the sales registration data registered in the sales registration table 243 to the payment device 8 via the server 4. In this instance, the payment processing unit 207 controls the communication unit 27 to transmit the sales registration data registered in the sales registration table 243 to the server 4 together with identification ID capable of identifying the terminal device 2 or identification ID capable of identifying the transaction. Further, the payment processing unit 207 controls the communication unit 27 to transmit the identification ID to the payment device 8 of the accounting destination by short-range wireless communication. Then, the payment device 8 inquires of the server 4 about the identification ID transmitted from the payment processing unit 207 to acquire sales registration data corresponding to the identification ID.

It should be noted that the manner of identification notification to the payment device 8 is not limited to the short-range wireless communication. For example, the payment processing unit 207 may notify the payment device 8 of the identification ID via the code symbol by encoding the identification ID into a code symbol such as a two-dimensional code and displaying it on the display unit 25. In this case, the payment device 8 can acquire the identification ID from the terminal device 2 by reading the code symbol displayed on the display unit 25.

Further, for example, the payment processing unit 207 may control the communication unit 27 to transmit the identification ID of its own terminal device 2 to the payment device 8 by short-range wireless communication such as Bluetooth (registered trademark). In this case, the payment device 8 acquires the sales registration data corresponding to the identification ID transmitted from the terminal device 2 from the server 4, and performs the checkout process of the item corresponding to the one transaction registered in the sales based on the acquired sales registration data.

Note that the settlement of the item is not limited to the method using the payment device 8, and may be performed by the terminal device 2. For example, the payment processing unit 207 controls the display unit 25 to display a screen for selecting a payment method such as electronic money settlement or credit settlement when receiving an operation for instructing the settlement start via the operating unit 26. When the settlement method is selected, the payment processing unit 207 receives the input of the settlement information for performing the settlement by the selected settlement method, and executes the payment processing for settling the total amount of the items registered for sales based on the input settlement information by cooperating with an external settlement server. Such payment information may be, for example, a credit card number or a two-dimensional code for code payment. In addition, the payment processing unit 207 may detect the input of the two-dimensional code for code payment via the imaging unit 34.

Figure 7:
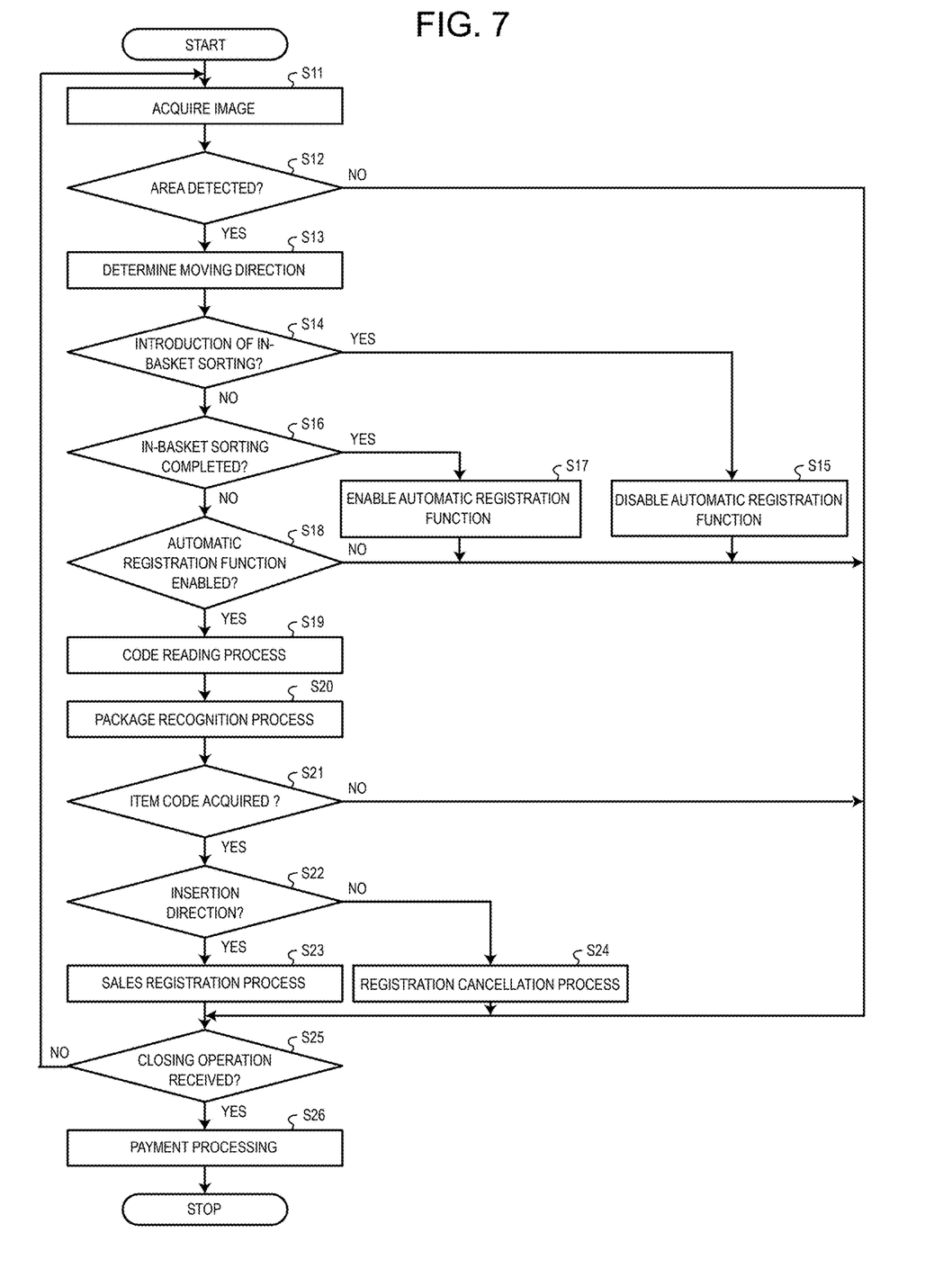
FIG. 7 is a flowchart of a sales registration process performed by the terminal device.

Next, an example of the sales registration process performed by the terminal device 2 will be described. FIG. 7 is a flowchart illustrating an example of a sales registration process performed by the terminal device 2.

First, the image acquisition unit 201 of the terminal device 2 sequentially acquires the images captured by the imaging unit 34 (step S11). Next, the object area detection unit 202 determines whether an item area or a hand area is detected from the images captured in the step S11 (step S12). Here, if neither the item area nor the hand area is detected (step S12, No), the process proceeds to step S25. In addition, when the item area or the hand area can be detected (step S12, Yes), the object area detection unit 202 detects the moving direction of the detected area from the images continuously acquired in time series (step S13).

Subsequently, the registration control unit 206 determines whether the start of in-basket sorting has been detected based on the operation status of the button 261 or the processing results of the step S12 and S13 (step S14). When the start of the in-basket sorting is detected (step S14, Yes), the registration control unit 206 sets to a control flag a value indicating the automatic registration function disabled (step S15), and proceeds to step S25. Here, it is assumed that the control flag is stored in, for example, the RAM 23, and the default value of the flag indicates the auto-registration function enabled. Note that the registration control unit 206 may cause the display unit 25 to display a message or the like for notifying that the automatic registration function is disabled in accordance with the process of the step S15.

Further, if the step S14 does not detect the start of the in-basket sorting (step S14, No), the registration control unit 206 determines whether the end of the in-basket sorting has been detected based on the operation via the button 261 or the processing of the step S12 and S13 (step S16). When the completion of the in-basket sorting is detected (step S16, Yes), the registration control unit 206 sets to the control flag a value indicating the auto registration function enabled (step S17), and proceeds to step S25. Incidentally, the registration control unit 206 may delete, in accordance with the process of the step S17, a message or the like displayed on the display unit 25, indicating that the auto registration function is disabled.

When the completion of the in-basket sorting is not detected in step S16 (step S16, No), the registration control unit 206 determines whether the auto registration function is enabled based on the value of the control flag (step S18). Here, when the automatic registration function is disabled (step S18, No), the registration control unit 206 shifts the process to step S25. When the automatic registration function is enabled (step S18, Yes), the registration control unit 206 shifts the process to step S19.

In subsequent step S19, the code reading unit 203 executes a code reading process of reading a code symbol (i.e., an item code) from the item area detected by the object area detection unit 202 (step S19). Further, the package recognition unit 204 executes a package recognition process based on the item area detected by the object area detection unit 202 (step S20).

Subsequently, the registration processing unit 205 determines whether the item code has been acquired by any of the processing of step S19 and step S20 (step S21). If the item code is not acquired (step S21, No), the process proceeds to step S25. When the item code is acquired (step S21, Yes), the registration processing unit 205 determines whether the moving direction of the item area determined in the step S13 is the placing direction or the take-out direction (step S22).

Here, when the moving direction is the placing direction (step S22, Yes), the registration processing unit 205 executes the sales registration processing of registering the item corresponding to the item code in the sales registration table 243 based on the item code acquired in the step S19 or the step S20 (step S23). In addition, when the moving direction is the take-out direction (step S22; No), the registration processing unit 205 executes a registration cancellation process of deleting an item corresponding to the item code acquired in step S19 or step S20 from the sales registration table 243 (step S24).

Subsequently, the registration processing unit 205 (or the payment processing unit 207) determines whether a closing operation has been accepted (step S25). Here, if the closing operation is not accepted (step S25, No), the process returns to step S11. When the closing operation is received (step S25, Yes), the payment processing unit 207 executes payment processing for the item registered in the sales registration table 243 (step S26).

As a result, in the terminal device 2, it is possible to perform sales registration and registration cancellation processes on an item by using either one of its item code read from a code symbol and the item code specified from the appearance feature of the item. Further, in the terminal device 2, the control flag is set to be disabled in accordance with the in-basket sorting of the customer, and the automatic registration function is disabled while the control flag is set to be disabled, so that the customer can suitably perform the in-basket sorting.

As described above, the terminal device 2 of the present embodiment acquires an image of the basket 31 that stores the item, and identifies an item placed into the basket 31 or taken out from the basket 31 based on the captured image. Then, the terminal device 2 performs a process of registering the item or canceling the registered item based on the identification result by the automatic registration function. In addition, the terminal device 2 performs control for disabling the automatic registration function on condition that the customer has performed a predetermined operation.

Thus, the terminal device 2 can prevent sales registration and registration cancellation of an item from being performed automatically if the items stored in the basket 31 are sorted by a customer.

It should be noted that the above-described embodiments can be modified and implemented as appropriate by changing a part of the configuration or function of each of the above-described apparatuses. Therefore, in the following, some modifications according to the above-described embodiments will be described as other embodiments. Note that, in the following, differences from the above-described embodiments will be mainly described, and detailed descriptions of the same points as those described above will be omitted. Further, the modification examples described below may be implemented individually or in combination as appropriate.

Modification 1

In the above-described embodiments, the terminal device 2 attached to the cart 3 has been described, but the form of the terminal device 2 is not limited thereto. For example, the terminal device 2 may be a portable terminal such as a smartphone carried by a customer, or a portable terminal such as a smartphone or a tablet terminal loaned to a customer by a store.

In this case, the terminal device 2 may be configured to cooperate with the cart 3 by performing wired or wireless communication with the imaging unit 34, or may be configured to be independent of the cart 3. In the latter case, the customer can perform sales registration of an item by imaging the item with the camera included in the terminal device 2, as in the above-described embodiments. In addition, when canceling registration, the customer selects an item to be canceled from the sales-registered items displayed in the list on the screen of the terminal device 2, so that the registration can be cancelled as in the above-described embodiment.

Modification 2

In the above-described embodiments, the terminal device 2 performs a package recognition process, but the configuration is not limited thereto, and may be performed by an external device for the package recognition process.

In this case, the package recognition unit 204 of the terminal device 2 performs the same functions as those of the above-described embodiments by cooperating with an external device for the package recognition process. Specifically, the package recognition unit 204 controls the communication unit 27 to transmit the image of the image region detected by the object area detection unit 202 to an external device for the package recognition process, thereby causing the external device to execute the package recognition process, and acquires the processing result of the package recognition process, that is, the recognition result of the item, from the external device.

Thus, in the checkout system 1 according to the present modification, since the external device performs the package recognition process, the processing load of the terminal device 2 can be reduced.

Modification 3

In the above-described embodiments, a code symbol representing an item code attached to an item is read from an image captured by the imaging unit 34, but the present invention is not limited thereto, and for example, a configuration may be adopted in which a code reading device specialized for reading code symbols is separately provided.

The code reader may be a type of code reader that a customer holds and uses in his or her hand, or may be a code reader that is located towards the customer. When such a code reader is used, the customer causes the code reader to read the code symbol attached to an item, and then places the item into the storage device 31.

In this case, it is preferable that the registration processing unit 205 ignores the recognition result of the package recognition unit 204 even if the same item is recognized by the package recognition unit 204 for a predetermined time (for example, 5 seconds) after the item is read by the code reader. Thus, even when an item read by the code reader is also recognized by the package recognition process, it is possible to prevent the item from being registered redundantly.

In addition, in a case where there is no possibility that the code reader reads the item in the basket 31, the registration control unit 206 may keep the function enabled without disabling the function of the code reading unit 203 even if the start of the in-basket sorting is detected.

Thus, in the checkout system 1 according to the present modification, even in a configuration in which the code symbol is read by using the code reading device, the same effects as those of the above-described embodiments can be obtained.

Programs executed by the apparatuses of the above-described embodiments and modifications are stored in advance in their ROMs, storage units, or the like. The programs executed by the apparatuses of the above-described embodiments may be recorded in a computer-readable recording medium such as a CD-ROM, a flexible disk (FD), a CD-R, a Digital Versatile Disk (DVD) in an installable format or an executable format.

Further, the programs executed by each apparatus of the above-described embodiments may be stored in a computer connected to a network such as the Internet, and may be downloaded via the network. Further, the programs executed by each apparatus of the above-described embodiments may be provided or distributed via a network such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A point-of-sale (POS) terminal attachable to a shopping cart, comprising:
an interface circuit connected to an imaging device;
an input device; and
a processor configured to:
control the imaging device to capture images and generate image data based on the captured images,
perform object recognition on the image data, and
perform an automatic registration process for automatically registering an item for purchase when the item is identified by the object recognition, wherein
the processor is further configured to:
determine whether a first predetermined motion of a body part is detected based on a result of object recognition or whether a predetermined operation is input via the input device, and
upon determining that the first predetermined motion is detected or the predetermined operation is input, temporarily disable the automatic registration process such that an item is not automatically registered for purchase or is not automatically removed from a list of registered items even when the item is identified by the object recognition.

2. The POS terminal according to claim 1, wherein the first predetermined motion is a motion of hands moving towards a basket of the shopping cart.

3. The POS terminal according to claim 1, wherein the first predetermined motion is a horizontal motion of a hand holding an item inside a basket of the shopping cart.

4. The POS terminal according to claim 1, wherein the processor is configured to, after the automatic registration process is disabled by the first predetermined motion:
control the imaging device to capture additional images and generate another image data based on the additional images,
perform object recognition on said another image data,
determine whether a second predetermined motion of the body part is detected based on a result of the object recognition, and
upon determining that the second predetermined motion is detected, enable the automatic registration process.

5. The POS terminal according to claim 4, wherein
the first predetermined motion is a motion of hands moving towards a basket of the shopping cart, and
the second predetermined motion is a motion of hands pulling back from the basket.

6. The POS terminal according to claim 1, wherein the processor is configured to, after the automatic registration process is disabled by the predetermined operation:
determine whether another predetermined operation is input via the input device, and
upon determining that said another predetermined operation is input, enable the automatic registration process.

7. The POS terminal according to claim 6, wherein the input device is a button through which the predetermined operation and said another predetermined operation can be input.

8. The POS terminal according to claim 1, further comprising:
a display, wherein
the processor is configured to control the display to display a message while the automatic registration process is disabled.

9. The POS terminal according to claim 1, further comprising:
a display; wherein
the processor is configured to, after an operation is input via the input device:
generate a code associated with the registered item and readable by a payment device for performing a payment process, and
control the display to display the generated code.

10. The POS terminal according to claim 9, further comprising:
a network interface connectable to a server, wherein
the processor is configured to generate data indicating the registered item and control the network interface to transmit the generated data to the server after the operation is input via the input device.

11. A method performed by a point-of-sale (POS) terminal attachable to a shopping cart, the method comprising:
capturing images and generating image data based on the captured images;
performing object recognition on the image data; and
performing an automatic registration process for automatically registering an item for purchase when the item is identified by the object recognition, wherein
the method further comprises:
determining that a first predetermined motion of a body part is detected based on a result of object recognition or whether a predetermined operation is input, and
temporarily disabling the automatic registration process such that an item is not automatically registered for purchase or is not automatically removed from a list of registered items even when the item is identified by the object recognition.

12. The method according to claim 11, wherein the first predetermined motion is a motion of hands moving towards a basket of the shopping cart.

13. The method according to claim 11, wherein the first predetermined motion is a horizontal motion of a hand holding an item inside a basket of the shopping cart.

14. The method according to claim 11, further comprising, after the automatic registration process is disabled by the first predetermined motion:
capturing additional images and generating another image data based on the additional images;
performing object recognition on said another image data;
determining that a second predetermined motion of the body part is detected based on a result of the object recognition; and
enabling the automatic registration process.

15. The method according to claim 14, wherein
the first predetermined motion is a motion of hands moving towards a basket of the shopping cart, and
the second predetermined motion is a motion of hands pulling back from the basket.

16. The method according to claim 11, further comprising, after the automatic registration process is disabled by the predetermined operation:
determining that another predetermined operation is input; and
enabling the automatic registration process.

17. The method according to claim 16, wherein the predetermined operation and said another predetermined operation are pressing a button of the POS terminal.

18. The method according to claim 11, further comprising:
displaying a message while the automatic registration process is disabled.

19. The method according to claim 11, further comprising, in response to an input of an operation:
generating a code associated with the registered item and readable by a payment device for performing a payment process; and
displaying the generated code.

20. A non-transitory computer readable medium storing a program causing a computer to execute a method comprising:
capturing an image and generating image data based on the captured image;
performing object recognition on the image data; and
performing an automatic registration process for automatically registering an item for purchase when the item is identified by the object recognition, wherein
the method further comprises:
determining that a first predetermined motion of a body part is detected based on a result of object recognition or whether a predetermined operation is input, and
temporarily disabling the automatic registration process such that an item is not automatically registered for purchase or is not automatically removed from a list of registered items even when the item is identified by the object recognition.

* * * * *